(12) United States Patent
Awdeh

(10) Patent No.: US 6,175,568 B1
(45) Date of Patent: Jan. 16, 2001

(54) ABR POLICING METHOD AND APPARATUS

(75) Inventor: Ra'ed Yousif Awdeh, Ottawa (CA)

(73) Assignee: Nortel Networks Limited, Montreal (CA)

( * ) Notice: Under 35 U.S.C. 154(b), the term of this patent shall be extended for 0 days.

(21) Appl. No.: 08/991,553

(22) Filed: Dec. 16, 1997

(51) Int. Cl.[7] .............................. H04L 12/28; H04L 12/26

(52) U.S. Cl. .......................................... 370/395; 370/231

(58) Field of Search ...................................... 370/230, 231, 370/232, 233, 234, 235, 229, 236, 395, 468

(56) References Cited

U.S. PATENT DOCUMENTS

| | | | |
|---|---|---|---|
| 5,940,368 | * 8/1999 | Takamichi et al. | 370/229 |
| 6,005,843 | * 12/1999 | Kamiya | 370/231 |
| 6,021,116 | * 2/2000 | Chiussi et al. | 370/236 |
| 6,038,217 | * 3/2000 | Lyles | 370/233 |

OTHER PUBLICATIONS

Title: The ATM Forum Technical Committee Submission regarding Improved Algorithm B for ABR Conformance; Date: Apr. 15, 1996; Author: John Adams (4 pages).

* cited by examiner

Primary Examiner—Chi H. Pham
Assistant Examiner—Brenda H. Pham

(57) ABSTRACT

An apparatus and a computer readable storage medium having computer readable instructions for directing a processor to execute a method executable by the apparatus for adjusting policing cell rates at a switch interface, for cells received from a source in an allowed cell rate system. The method includes the steps of storing a current policing rate (PACR) in a current policing rate buffer, storing a plurality of policing rates and policing rate application times in respective policing rate and policing rate application time buffers and in response to the departure of a backward resource management cell to the source at time tb(j), setting the contents of the policing rate buffers and the policing rate application time buffers according to the relative magnitudes of the current policing rate and the contents of the policing rate buffers.

43 Claims, 9 Drawing Sheets

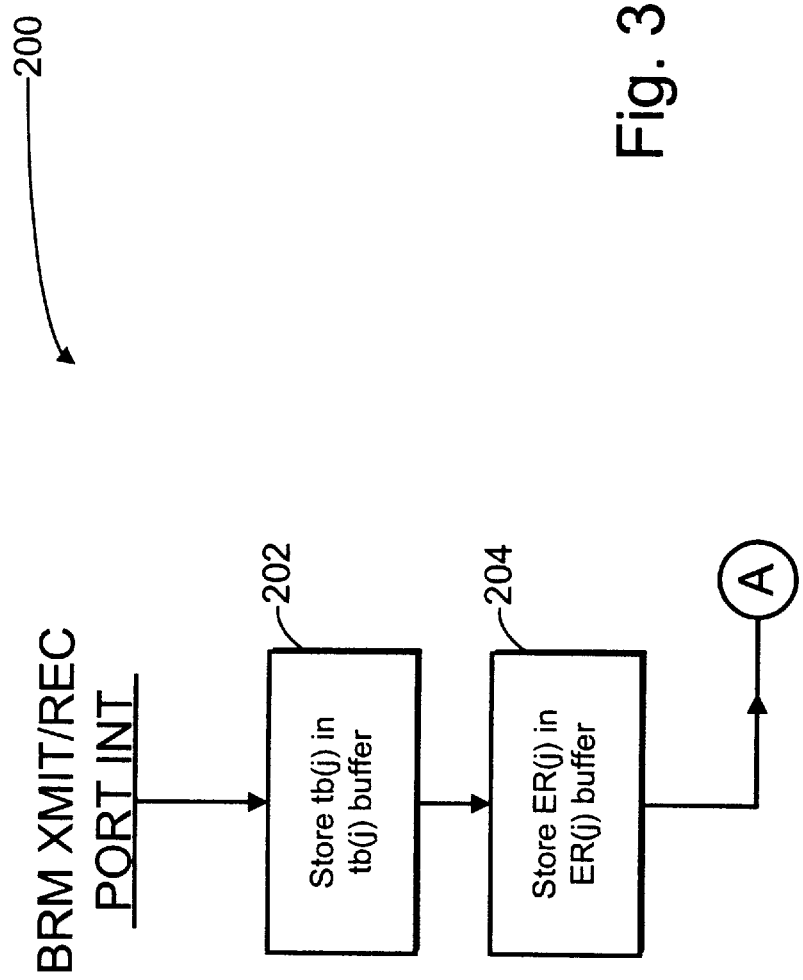

SCHEDULE UPDATE ALGORITHM if(now>=$t_{first}$ && $t_{first}$!=0) —206, 210

$PACR = DER_{first}$; —212

$t_{first} = t_{last}$; —214

$DER_{first} = DER_{last}$; —216         } 208

$t_{last} = 0$; —218

$DER_{last} = 0$; —220

FIG. 4a

222— if($t_{first}$ == 0)

224 —— $DER_{first} = ER(j)$;

226 —— if(ER(j) >= PACR)   $t_{first} = tb(j)+\tau_3$;

228 —— else                 $t_{first} = tb(j)+\tau_2$;

FIG. 4b

230 —— else if($t_{last}$ == 0)
232 —— $DER_{last}$ = ER(j);
234 —— if(ER(j) >= $DER_{first}$)       $t_{last}$ = tb(j)+$\tau_3$;
236 —— else                              $t_{last}$ = tb(j)+$\tau_2$;

238 —— else if($DER_{first}$ >= $DER_{last}$)
       {
240 ——   if(ER(j)<$DER_{first}$ && ER(j)>=$DER_{last}$)
242 ——     if(PACR>=$DER_{first}$ && (PACR-$DER_{first}$)/($t_{last}$-$t_{first}$)<(ER(j)-$DER_{last}$)(tb(j)+$\tau_3$-$t_{last}$))
244 ——       $t_{first}$=$t_{last}$; $DER_{first}$=$DER_{last}$; $t_{last}$=tb(j)+$\tau_3$; $DER_{last}$=ER(j);
         else
246 ——     $DER_{last}$=ER(j);
248 ——   else if(ER(j)<$DER_{first}$ && ER(j)<$DER_{last}$)
250 ——     if(PACR>=$DER_{first}$ && (PACR-$DER_{first}$)/($t_{last}$-$t_{first}$)<($DER_{first}$-$DER_{last}$)(tb(j)+$\tau_2$-$t_{last}$))

FIG. 4c

```
        t_first=t_last; DER_first=DER_last; t_last=tb(j)+τ_2; DER_last=ER(j);
    else
        t_last=tb(j)+τ_2; DER_last=ER(j);
252 ── else if(ER(j)>=DER_first && ER(j)>=DER_last)
254 ──    if(PACR>=DER_first && (PACR-DER_first)/(t_last-t_first)<(DER_first-DER_last)/(tb(j)+τ_3-t_last))
            t_first=t_last; DER_first=DER_last; t_last=tb(j)+τ_3; DER_last=ER(j);
        else
            t_last=tb(j)+τ_3; DER_last=ER(j);
    }
    else
    {
256 ── if(ER(j)>=DER_first && ER(j)>=DER_last)
258 ──    if(PACR>=DER_first && (PACR-DER_first)/(t_last-t_first)<(ER(j)-DER_last)/(tb(j)+τ_3-t_last))
            t_first=t_last; DER_first=DER_last; t_last=tb(j)+τ_3; DER_last=ER(j);
```

FIG. 4d

```
260 ─────── if(t_last>tb(j)+τ_3 ) t_last=tb(j)+τ_3 ;
                DER_last=ER(j);
262 ── else if(ER(j)>=DER_first && ER(j)<DER_last)
264 ─── if(PACR>=DER_first && PACR<DER_last)
                t_first=t_last; DER_first=DER_last; t_last=tb(j)+τ_2 ; DER_last=ER(j);
           else
                DER_first=DER_last; t_last=tb(j)+τ_2 ; DER_last=ER(j);
266 ── else if(ER(j)<DER_first && ER(j)<DER_last)
268 ─── if(PACR>=DER_first && PACR<DER_last)
                t_first=t_last; DER_first=DER_last; t_last=tb(j)+τ_2 ; DER_last=ER(j);
           else
                DER_first=DER_last; t_last=tb(j)+τ_2 ; DER_last=ER(j);
```

FIG. 4e if($t_{first}$>$t_{last}$) ← 270

$t_{first}$ = $t_{last}$;

$DER_{first}$ = $DER_{last}$;

$t_{last}$ = 0;

$DER_{last}$ = 0;

FIG. 4f

POLICING ALGORITHM

274 — if(now>=$t_{first}$ && $t_{first}$!=0) ← 273

PACR = $DER_{first}$;

$t_{first}$ = $t_{last}$;

$DER_{first}$ = $DER_{last}$;

$t_{last}$ = 0;

$DER_{last}$ = 0;

FIG. 5a

276 — if(CLP=0 FRM cell)

278 —— if(ta(k)-$t_f$ > ADTF+$\tau_1$) PACR = min (ICR, PACR);

280 — Incr = min (1/PACR, I_old);

FIG. 5c

282 — if(LVST+Incr <= ta(k)+$\tau_1$)

LVST = max (ta(k), LVST+Incr);

I_old = 1/PACR;

FIG. 5d

ABR POLICING METHOD AND APPARATUS

FIELD OF THE INVENTION

This invention relates to methods and apparatus for adjusting policing rates in Available Bit Rate dynamic policing.

BACKGROUND OF THE INVENTION

Policing is a key function normally performed at the edge of a public network where bad traffic should never be allowed to cause the violation of quality of service guarantees on good traffic. Policing of available bit rate (ABR) end systems is more challenging than for constant bit rate (CBR) or even variable bit rate (VBR). This is mainly because the allowed cell rate (ACR) for an ABR source can change with every resource management (RM) cell that returns to it and thus the ABR policer cannot simply assume static policing parameters. This is why ABR policing is usually described as dynamic. In particular, when the generic cell rate algorithm (GCRA) is used for ABR, it is called dynamic GCRA or DGCRA.

An ideal ABR DGCRA is too costly to implement, since it requires storing a potentially very large number of policing rate updates and their associated application times per ABR connection. Hence, several approximate DGCRAs have been proposed where only two delayed rate updates need to be stored per connection.

In general, a public network cannot and should not blindly trust its users. Through policing, the network ensures that bad traffic (i.e. the traffic emitted onto the network in violation of the traffic contracts between the network and the involved users) does not result in violating the network's quality of service guarantees to users submitting good traffic. Furthermore, a user who persists in violating his contract with the network may be declared as non-compliant.

Conventional generic cell rate algorithms (GCRAs) are bufferless leaky bucket algorithms which are widely accepted and used for CBR, VBR and unspecified bit rate (UBR) policing. During connection setup, the GCRA policer is provided with the connection's traffic descriptor. For CBR, that includes peak cell rate (PCR) and cell delayed variation tolerance (CDVT). For BVR, it includes PCR, sustainable cell rate (SCR), Maximum Burst Size (MBS) and CDVT. For UBR, it includes PCR and CDVT. Non-conforming cells may be CLPl-tagged (cell loss priority 1) (in the case of VBR and UBR) or discarded (in the case of CBR, VBR and UBR).

The GCRA policer simply ensures that the source rate is within the contracted traffic descriptor. ABR policing is much more challenging because of two main reasons, namely the dynamic nature of the allowed cell rate (ACR of the ABR source) which can change with every returning backward resource management (BRM) cell, and the many rules that the ABR end system is required to follow. The dynamic nature of the allowed cell rate provides a reason for why the GCRA is called dynamic, when used for ABR policing.

The main objective behind ABR policing is to identify and possibly take actions against ABR traffic/users which do not follow the reference behaviour specified by the ATM forum, so that they may not impact good traffic.

Generally, good ABR users are ones which follow the ATM Forum (ATMF) specifications and thus generate forward resource management (FRM) cells including both in-rate and out of rate cells, as specified, insert the correct values in the current cell rate (CCR) and minimum cell rate (MCR) fields of FRM cells, schedule FRM cells, BRM cells and data cells as specified, obey network feedback carried by returning BRM cells by adjusting the ACR accordingly, reduce the ACR when BRM cells do not return as required, or when used after a long period of idleness, and turn around FRM cells received after changing DIR bits.

An ideal ABR policer should monitor the RM cell flow, particularly BRM cells and emulate the expected ABR end system behaviour to determine if the end system is doing what it is supposed to do. Furthermore, the feedback delay from and to the end system must be taken into account. The ideal ABR policer, however, is too complex to build because it requires emulation of the already complex ABR source behaviour with all the processing and parameter storage required and requires storing a potentially large number of ER updates and their associated application times for each ABR connection.

The application time for a given ER is the time at which that ER becomes a policing rate and this depends on the feedback delay to the source. When the policer sees a BRM cell heading to the source with a certain ER value, it cannot simply and immediately adjust its policing rate to that ER. It must allow enough time before allowing the recently observed ER. The time which must be allowed is the time needed for the BRM cell to reach the source, the source to adjust its ACR accordingly, and the new rate to be felt at the policer.

Therefore, depending mainly on the distance between the source and the policer, a potentially large number of outstanding ER updates may have to be stored. For example, if the source is 100 kilometres away from the policer and the rate fluctuates, say between 500 Mbps and 600 Mbps on a given connection then using NRM equals 32, more than 368 ER updates and their associated application times have to be stored, which is too costly to implement. (NRM is the number of cells that the source end system is required to send between each successive RM cell.)

SUMMARY OF THE INVENTION

In accordance with one aspect of the invention, there is provided a method of adjusting policing cell rates at a switch interface, for cells received from a source in an allowed cell rate system, the method including the steps of:

a) storing a current policing rate (PACR) in a current policing rate buffer;

b) storing a plurality of policing rates and policing rate application times in respective policing rate and policing rate application time buffers; and c) in response to the departure of a backward resource management cell to the source at time tb(j), setting the contents of the policing rate buffers and the policing rate application time buffers according to the relative magnitudes of the current policing rate and the contents of the policing rate buffers.

Preferably, the method includes the steps of, storing a current policing rate (PACR) in a current policing rate buffer, storing a first policing rate ($DER_{first}$) and a first policing rate application time ($t_{first}$) in a first policing rate buffer and a first policing rate time buffer respectively and storing a last policing rate ($DER_{last}$) and a last policing rate application time ($t_{last}$) in a last policing rate buffer and a last policing rate time buffer respectively.

Preferably, the method includes the steps of receiving a backward resource management cell and on receiving such cell, determining whether or not a current cell rate is greater than or equal to the first policing rate and if so copying the first policing rate into the current policing rate buffer, copying the last policing rate application time into the first policing rate application time buffer, copying the last policing rate into the first policing rate buffer and setting the contents of the last policing rate buffer and the last policing rate application time buffer to zero.

Preferably, the method includes the steps of determining whether or not the first policing rate application time is earlier than the last policing rate application time and if so copying the first policing rate into the current policing rate buffer, copying the last policing rate application time into the first policing rate application time buffer, copying the last policing rate into the first policing rate buffer and setting the contents of the last policing rate buffer and the last policing rate application time buffer to zero.

Preferably, the method includes the steps of receiving a cell from the source at a time ta(k) and determining whether or not the current policing rate should be updated.

Preferably, the method includes the steps of determining whether the current policing rate is equal to the first policing rate and whether the first policing rate application time is equal to the last policing rate application time and whether the first policing rate is equal to the last policing rate and whether the last policing rate application time is equal to zero and whether the last policing rate is equal to zero and if so, changing the current policing rate.

Preferably, the method includes the steps of determining whether or not the cell received from the source conforms to the policing rate.

Preferably, the method includes the step of calculating a policing increment value.

Preferably, the method includes the step of determining the minimum value of the reciprocal of a current and immediately past policing increment values.

Preferably, the method includes the steps of determining whether or not the sum of a last virtual scheduling time (LVST) and the minimum value is less than or equal to the sum of the time ta(k) and a cell delay variation tolerance value.

In accordance with another aspect of the invention, there is provided a method of policing cell rates at a switch interface, for cells received from a source in an allowed cell rate system, the method including the steps of:

a) storing a current policing rate (PACR) in a current policing rate buffer;

b) storing a plurality of policing rates and policing rate application times in respective policing rate and policing rate application time buffers;

c) in response to the departure of a backward resource management cell to the source at time tb(j), setting the contents of the policing rate buffers and the policing rate application time buffers according to the relative magnitudes of the current policing rate buffer and the contents of the policing rate buffers; and d) determining whether or not the cell received from the source conforms to the policing rate and if not rejecting the cell received from the source.

In accordance with another aspect of the invention, there is provided an apparatus for adjusting policing cell rates at a switch interface, for cells received from a source in an allowed cell rate system. The apparatus includes memory for storing a current policing rate (PACR) in a current policing rate buffer, memory for storing a plurality of policing rates and policing rate application times in respective policing rate and policing rate application time buffers, a BRM cell departure signal generator for generating a BRM cell departure signal when a BRM cell to transmitted to a source end system, and a processor for setting the contents of the policing rate buffers and the policing rate application time buffers according to the relative magnitudes of the current policing rate and the contents of the policing rate buffer, in response to the departure of a backward resource management cell to the source.

Preferably, the apparatus includes a timer for providing an indication of a current time tb(j) at which the BRM cell is transmitted.

Preferably, the apparatus includes a current policing rate buffer for storing a current policing rate (PACR), a first policing rate buffer and a first policing rate time buffer for storing a first policing rate ($DER_{first}$) and a first policing rate application time ($t_{first}$) respectively and a last policing rate buffer and a last policing rate time buffer for storing a last policing rate ($DER_{last}$) and a last policing rate application time ($t_{last}$) respectively.

Preferably, the apparatus includes a receiver for receiving a backward resource management cell and processor-readable instructions for directing the processor to determine whether or not a current cell rate is greater than or equal to the first policing rate and if so, copying the first policing rate into the current policing rate buffer, copying the last policing rate application time into the first policing rate application time buffer, copying the last policing rate into the first policing rate buffer and setting the contents of the last policing rate buffer and the last policing rate application time buffer to zero.

Preferably, the apparatus includes processor-readable instructions for directing the processor to determine whether or not the first policing rate application time is earlier than the last policing rate application time and if so, copying the first policing rate into the current policing rate buffer, copying the last policing rate application time into the first policing rate application time buffer, copying the last policing rate into the first policing rate buffer and setting the contents of the last policing rate buffer and the last policing rate application time buffer to zero.

Preferably, the apparatus includes a receiver for receiving a cell from the source at a time ta(k) and processor-readable instructions for directing the processor to determine whether or not the current policing rate should be updated.

Preferably, the apparatus includes processor-readable instructions for directing the processor to determine whether the current policing rate is equal to the first policing rate and for determining whether the first policing rate application time is equal to the last policing rate application time and for determining whether the first policing rate is equal to the last policing rate and for determining whether the last policing rate application time is equal to zero and for determining whether the last policing rate is equal to zero and if so, changing the contents of the current policing rate buffer.

Preferably, the apparatus includes processor-readable instructions for directing the processor to determine whether or not the cell received from the source conforms to the policing rate.

Preferably, the apparatus includes memory and processor-readable instructions for directing the processor to calculate and store a current policing increment value.

Preferably, the apparatus includes memory for storing the current and immediately past policing increment values and processor-readable instructions for directing the processor to determine the minimum value of the reciprocal of the current and immediately past policing increment values.

Preferably, the apparatus includes memory for storing a cell delay variation tolerance value and processor-readable instructions for directing the processor to determine whether or not the sum of a last virtual scheduling time (LVST) and the minimum value is less than or equal to the sum of the time ta(k) and the cell delay variation tolerance value.

In accordance with another aspect of the invention, there is provided a computer-readable storage medium on which is stored a plurality of computer readable instructions for directing a processor to adjust policing cell rates at a switch interface for cells received from a source in an allowed cell rate system. The instructions are operable to direct the processor to implement the method above.

BRIEF DESCRIPTION OF THE DRAWINGS

In drawings which illustrate embodiments of the invention,

FIG. 3 is a flowchart of a BRM explicit rate loading algorithm, according to the first embodiment of the invention;

FIG. 4a is a pseudo code listing of statements representing codes encoded in memory for directing a processor to execute a first portion of a schedule update algorithm, according to the first embodiment of the invention;

FIGS. 4b–4e are a pseudo code listings of statements representing codes encoded in memory for directing a processor to execute a second portion of the schedule update algorithm;

FIG. 4f is a pseudo code listing of statements representing codes encoded in memory for directing a processor to implement a third portion of the schedule update algorithm;

FIG. 5a is a pseudo code listing of statements representing codes encoded in memory for directing a processor to implement a first portion of a policing algorithm, according to the first embodiment of the invention;

FIG. 5b is a pseudo code listing of statements representing codes encoded in memory for directing a processor to implement a second portion of a policing algorithm;

FIG. 5c is a pseudo code listing of statements representing codes encoded in memory for directing a processor to implement a third portion of a policing algorithm; and FIG. 5d is a pseudo code listing of statements representing codes encoded in memory for directing a processor to implement a fourth portion of a policing algorithm.

DETAILED DESCRIPTION

Figure 1:
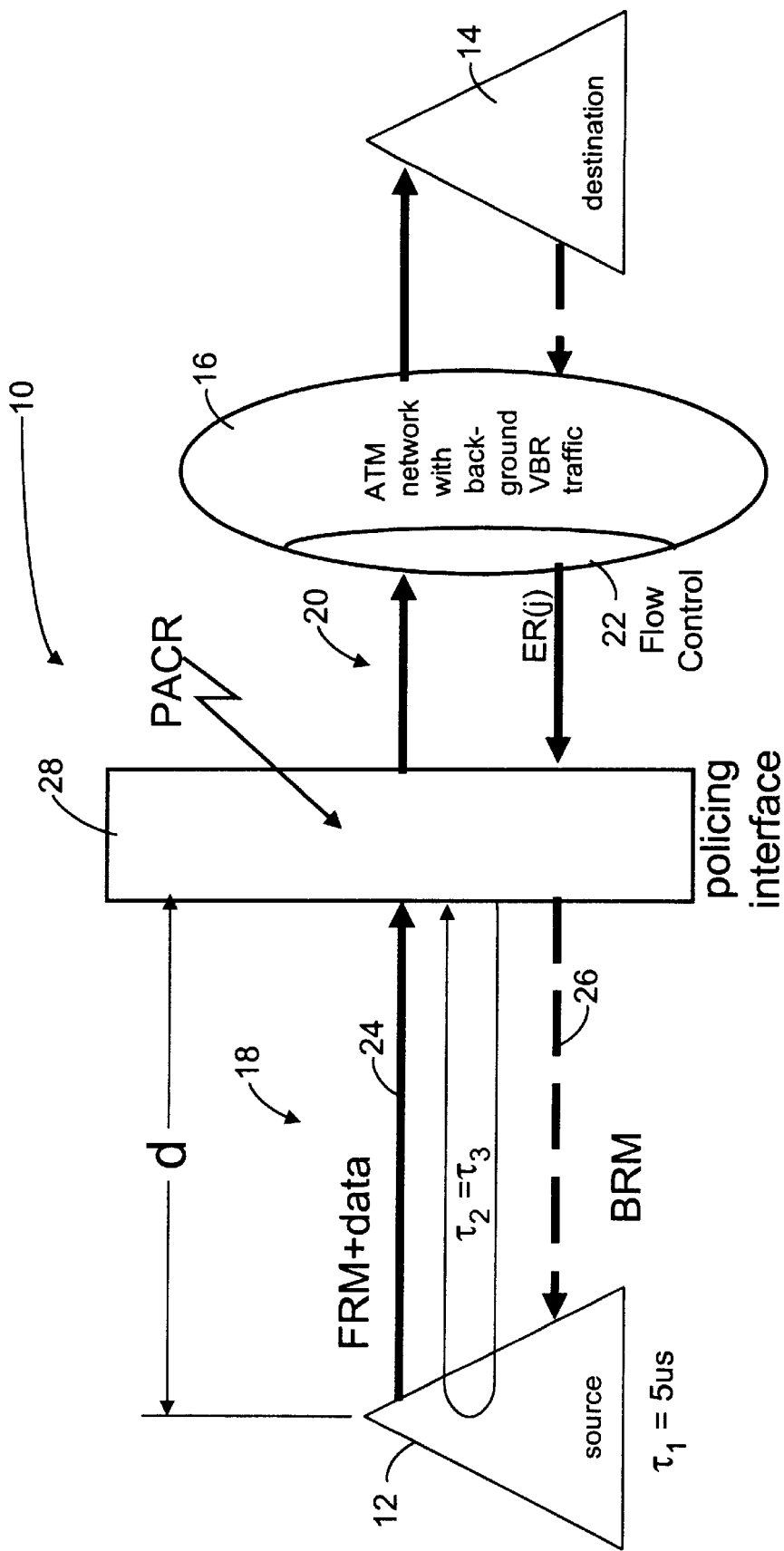
FIG. 1 is a schematic diagram of a system according to a first embodiment of the invention.

Referring to FIG. 1, an available bit rate system is shown generally at 10. The system includes an ABR source end system 12 and an ABR destination end system 14 connected through an ABR network 16 by respective communications links 18 and 20, or bi-directional connections.

Each communications link 18 and 20 is operable to support communications channels of the type operable to carry asynchronous transfer mode communications traffic according to an Available Bit Rate (ABR) Service Category definition as specified by the ATM Forum Technical Committee Traffic Management Specification Version 4.0, April 1996, incorporated herein by reference.

An ABR system is an ATM layer service category for which ATM layer transfer characteristics provided by the network may change subsequent to connection establishment. A flow control mechanism 22 is included in the network to support a plurality of types of feedback to the source end system 12 to control the rate of transmission of data from the source end system 12 to the network 16. This will be referred to as the explicit rate. This feedback is communicated to the source end system 12 through specific control cells known as Resource Management Cells, or RM Cells. Forward RM (FRM) cells are communicated in a direction from the source end system 12 to the destination end system 14. The destination end system 14 turns around the received FRM cells which become backward RM cells and sends them to the source and system 12. Backward RM (BRM) cells are communicated in a direction from the destination end system 14 to the source end system 12 and include explicit rate information indicating the rate at which data is to be transmitted from the source end system 12. Thus, there is a control loop including a forward RM cell flow path 24 and a backward RM cell flow path 26.

It is expected that an end system that adapts its traffic in accordance with the feedback will experience a low cell loss ratio and obtain a fair share of the available bandwidth on the channel, according to a network specific allocation policy.

On the establishment of an ABR connection, the source end system 12 and the network both agree to a maximum required bandwidth or peak cell ratio (PCR) and a minimum cell rate (MCR). The peak cell ratio is the maximum required bandwidth for the communications exchange to follow and the minimum cell rate is the minimum rate at which the communications exchange is to occur.

The available bit rate system 10 further includes a policing interface 28 that resides in an edge switch (not shown) of the ATM network 16. The policing interface 28 includes a processor 30 in communication with a BRM transmit/receive port 32, a cell receive port 34, a clock/timer 36, permanent memory 38, non-permanent memory 40, Read Only Memory (ROM) 41, and a disk drive 45. The policing interface acts as an apparatus for adjusting policing cell rates at a switch interface, for cells received from a source in an allowed cell rate system.

Referring to FIG. 1, when a distance (d) between the source 12 and the policing interface 28 a delay is introduced between the time the BRM cell is dispatched from the policing interface and the time the BRM cell is received at the source. In addition, there is a response time ($\tau$) for the source to change its forward cell rate and a further delay time for the forward data to be received at the policing interface 28. Therefore, the application time of a given new explicit cell rate ER(j) to forward data cells in the policing interface 28 is determined on the basis of the known delay time from the time a BRM cell is dispatched from the policing interface to receipt of forward data at the new rate. The determination of this known delay time is made empirically or by experiment, prior to engaging the policing interface 28 on the channel under consideration. Generally, the delay time is a function of the distance between the source end system 12 and the policing interface 28. In this embodiment, it is assumed that the delay time between the policing interface 28 and the source has a lower limit of $\tau 2$. It is also assumed that the delay time between the policing interface and the source has an upper limit of $\tau 3$.

It is also assumed that the delay time for the source to react in changing its forward cell rate in response to a new explicit cell rate in a BRM cell is $\tau 1$. This is referred to as the cell delay variation tolerance, or jitter tolerance.

Thus, it will be appreciated that each ABR connection has the pre-defined parameters including a cell delay variation tolerance, an upper limit on feedback delay (in seconds) and a lower limit on feedback delay (in seconds).

The BRM transmit/receive port 32 has an input 42 in communication with the network to receive BRM cells in ATM transmissions from the network to the source. The BRM transmit/receive port 32 also has an output 44 in communication with the source end system for transmitting BRM cells, received from the network, to the source. The BRM transmit/receive port also has a control port including an interrupt signal line 46, the control port acting as means for generating a BRM cell departure signal on the interrupt signal line 46 to indicate to the processor 30 when a BRM cell is transmitted from the BRM transmit/receive port 32. The BRM transmit/receive port also has a data bus 48 for communicating the explicit cell rate portion of the BRM cell to the processor 30. Thus, the processor 30 is able to capture the desired data transmission rate from the BRM transmit/receive port 32. The BRM transmit/receive port 32 acts as a BRM cell departure signal generator for generating a BRM cell departure signal when a BRM cell to transmitted to a source end system.

The cell receive port 34 has an input 50 in communication with the source for receiving FRM cells from the source, and has an output 52 in communication with the network for transmitting FRM cells to the network. The cell receive port 34 also has a control port 54 for indicating when a forward RM cell has arrived. Thus, the processor 30 is able to capture the current data transmission rate from the cell receive port 34.

The clock timer 36 provides to the processor a time value indicative of a time of day.

The processor is further in communication with the Read Only Memory (ROM) 41 which has programs for controlling the processor.

Finally, the processor produces a violation signal on a violation signal output 43, in accordance with programs stored in the ROM to indicate when a cell is not conforming to the current policing value.

Fixed Parameters

The permanent memory 38, in this embodiment includes flash memory apportioned to include a $\tau 1$ buffer 60, a $\tau 2$ buffer 62, a $\tau 3$ buffer 64, an initial cell rate (ICR) buffer 66 and an ACR Decrease Time Factor (in seconds) buffer 38, for storing fixed parameters by the same names associated with an ABR connection. $\tau 1$ represents the time delay between the time the source receives a BRM cell specifying a different explicit cell rate than is already in progress and the time the forward data transmitted by the source is transmitted at the new explicit rate. This is also known as the cell delay variation tolerance or jitter tolerance.

$\tau 2$ is a value representing the upper limit on feedback delay in transmissions between the policing interface and the source and $\tau 3$ is a value representing a lower limit on such feedback delay. In other words, $\tau 2$ and $\tau 3$ represent upper and lower limits respectively on the time for data to travel from the policing interface to the source end system.

The ACR decrease time factor defines the amount of transmission rate reduction required by the source end system in the event of BRM cell absence due to link failure, for example.

The initial cell rate is a value representing the initial cell rate in the forward direction and represents the forward data rate at the onset of a transmission. It has units of (cells/second).

Variable Parameters

The non-permanent memory 40 includes an LVST buffer 70, and I_old buffer 72, a tb(j) buffer 74, an ER(j) buffer 76, a $t_{last}$ buffer 78, a $DER_{last}$ buffer 80, a $t_{first}$ buffer 82 a $DER_{first}$ buffer 84, a PACR buffer 86, and a $t_f$ buffer 88.

The LVST buffer 70 is used to store a last virtual scheduled time (in seconds) value. Initially, the LVST buffer 70 is loaded with the value 0. The non-permanent memory thus acts as memory for storing a cell delay variation tolerance value The I_old Buffer 72 is used to store a previous policing increment value (in seconds). Initially this parameter has the value 1/ICR.

The tb(j) buffer 74 is used to store a time value read from the clock/timer immediately upon the transmission of the BRM cell from the BRM transmit/receive port. In other words, the clock/timer value immediately upon presentation of the BRM cell at the BRM transmitter/receiver output.

The ER(j) buffer 76 is used to store a new explicit rate value as determined from a BRM cell received at the BRM transmitter receiver.

The $DER_{last}$ buffer 80 is used to store a last scheduled rate to be used in policing rate calculations after the time specified by the contents of the $t_{last}$ buffer 78.

The $DER_{first}$ buffer 84 is used to store a first scheduled rate to be used in policing rate calculations after the time specified by the contents of the $t_{first}$ buffer 82.

The PACR buffer 86 is used to store a current policing rate value in cells per second, which is to be used in current policing rate calculations.

The $t_f$ buffer 88 is used to store a $t_f$ value representing the time at which the last CLP=0 FRM was received from the source.

The apparatus thus includes memory which acts as means for storing a current policing rate (PACR) in a current policing rate buffer and memory which acts as means for storing a plurality of policing rates and policing rate application times in respective policing rate and policing rate application time buffers. More particularly, the apparatus includes a current policing rate buffer for storing a current policing rate (PACR), a first policing rate buffer and a first policing rate time buffer for storing a first policing rate (DER first) and a first policing rate application time (t first) respectively and a last policing rate buffer and a last policing rate time buffer for storing a last policing rate (DER last) and a last policing rate application time (t last) respectively.

The ROM 41 includes respective blocks of code 200, 202 and 203 including instructions for directing the processor to execute a BRM explicit rate loading algorithm, a schedule update algorithm and a policing algorithm.

BRM Explicit Rate Loading Algorithm

Figure 2:
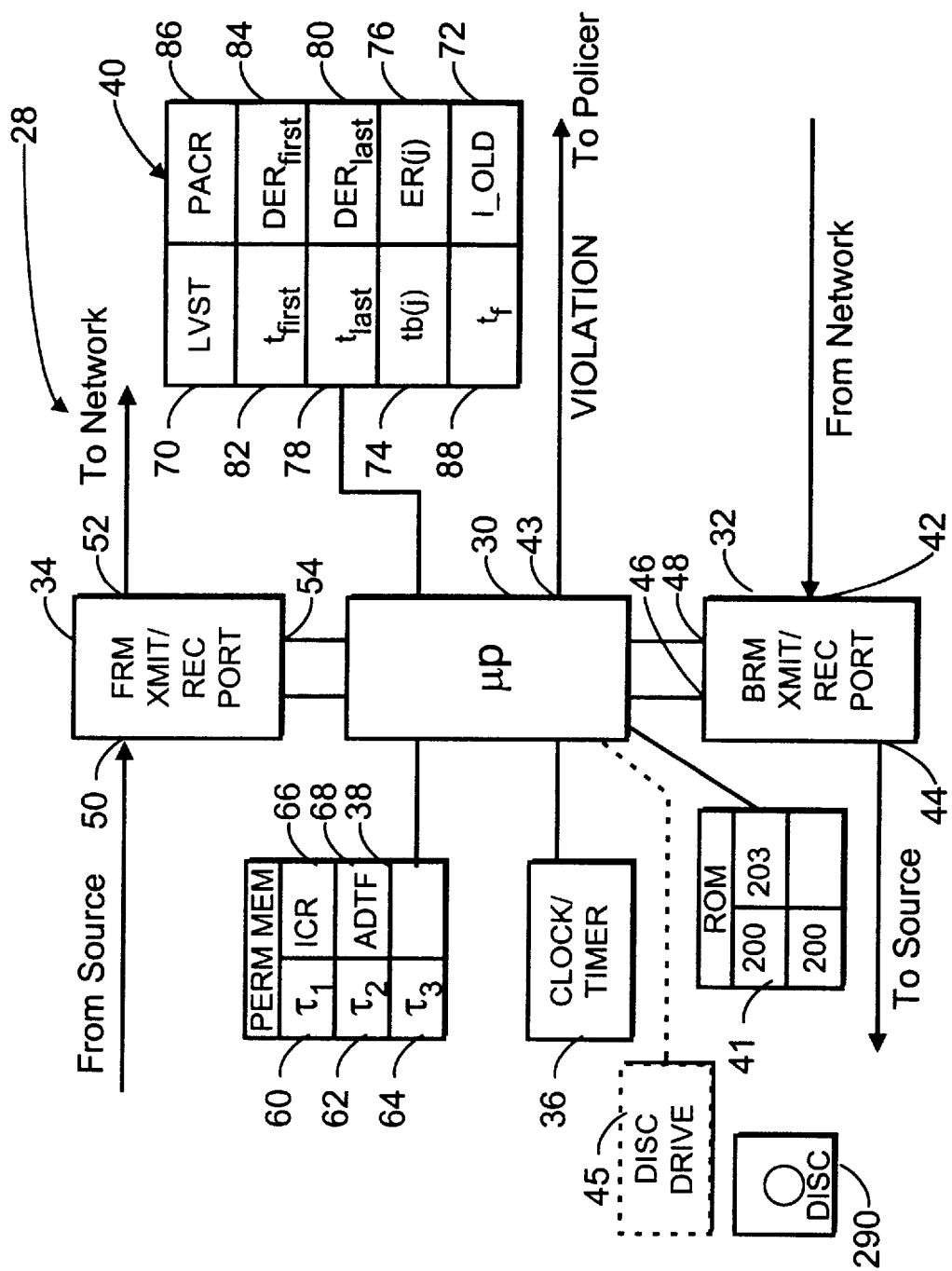
FIG. 2 is a block diagram of an apparatus, according to the first embodiment of the invention.

Referring to FIGS. 2 and 3, the BRM explicit rate loading algorithm is shown generally at 200. The processor begins executing this algorithm in response to receipt of a BRM cell departure signal on the interrupt signal line 46, provided by the BRM transmit/receive port 32 when a BRM cell is received from the network. The BRM transmit/receive port 32 immediately dispatches the BRM cell to the source, however, as soon as the outputs of the BRM transmit receipt port are rendered active, the BRM interrupt signal line 46 is rendered active. Thus, the BRM transmit/receive port 32 acts as a receiver and receiving means for receiving a backward resource management cell.

In response, the BRM explicit rate loading algorithm 200 begins with block 202 which directs the processor to retrieve the current time, tb(j) and store it in the tb(j) buffer 74. Thus, the clock timer 36 acts as a timer for providing an indication of a current time tb(j) at which the BRM cell is transmitted.

The processor is then directed to block 204 which directs it to store the explicit rate value as provided by the BRM transmit/receive port 32, in the ER(j) buffer 76.

The processor is then directed to the schedule update algorithm shown in FIG. 4.
FIG. 4
Schedule Update Algorithm Referring to FIGS. 2 and 4, the schedule update algorithm 100 is shown generally at 206. This algorithm includes three main portions shown in FIGS. 4(a) through (f) respectively.

Referring to FIGS. 2 and 4(a), the first portion of the schedule update algorithm is shown generally at 208 and directs the processor to determine whether or not the contents of the PACR buffer should be updated and, if so, to update them the PACR buffer includes a first step 210 which directs the processor to determine whether or not the current time as indicated by the clock timer 36, is greater than or equal to the value stored in the $t_{first}$ buffer 82 and whether or not simultaneously, the $t_{first}$ value is not equal to zero. If so, then steps 210 and 220 direct the processor to set the current policing rate equal to the first scheduled rate, to set the time at which the first scheduled rate becomes the policing rate equal to the time at which the last scheduled rate becomes the policing rate, to set the first scheduled rate equal to the last scheduled rate, to set the time at which the last scheduled rate becomes the policing rate equal to zero, and to set the last scheduled rate equal to zero. Values as indicated above are stored in respective buffers of the corresponding names. The processor is then directed to the second part of the schedule update algorithm shown in FIGS. 4(b)–4(e).

Referring to FIGS. 2 and 4(b), the second part of the scheduling algorithm updates schedule values and PACR depending upon the new rate ER(j) received in the ER(j) buffer. This part begins with statement 222 where the processor is directed to determine if the first scheduled time is equal to zero, and if so, the explicit rate value is stored in the first scheduled rate buffer as indicated by statement 224. Then, statement 226 directs the processor to determine whether or not the current explicit rate value is greater than or equal to the current policing rate (PACR), i.e. the case where the explicit rate is increasing, the contents of the first scheduled rate buffer are loaded with a time value representing the sum of tb(j) plus τ3. Otherwise, if the explicit rate ER(j) is decreasing, the first scheduled rate buffer $DER_{first}$ 84 is loaded with a value representing tb(j) plus τ2.

Referring to FIG. 4(c) if the contents of the last scheduled rate time buffer $t_{last}$ 78 are equal to zero, as indicated at statement 230, then statement 232 directs the processor to set the contents of the last scheduled rate buffer $DER_{last}$ 80 equal to the current explicit rate value ER(j). Statement 234 then directs the processor 30 to determine whether or not the current explicit rate ER(j) is greater than or equal to the contents of the first scheduled rate buffer $t_{first}$ 82, and if so, to set the contents of the last scheduled rate buffer $t_{last}$ 78 equal to a value calculated as the sum of tb(j) plus τ3. Otherwise, statement 236 directs the processor to set the contents of the last scheduled time buffer $t_{last}$ 82 equal to the contents of tb(j) plus τ2.

At statement 238, the processor 30 is directed to determine whether or not the first scheduled rate $DER_{first}$ is greater than or equal to the last scheduled rate $DER_{last}$. If so, then the processor 30 is directed to statement 240 which directs it to determine whether or not the current explicit rate value ER(j) is less than the first scheduled rate $DER_{first}$ and greater than or equal to the last scheduled rate $DER_{last}$. If so, then statement 242 directs the processor 30 to determine whether or not the current policing rate ER(j) is decreasing and which of two options provides the least cheating headroom.

For the first option, the cheating headroom is calculated as the product of the difference between the current explicit cell rate ER(j) and the last scheduled rate $t_{last}$ and the excess amount of time the last scheduled rate $t_{last}$ would remain in effect. The cheating headroom for the second option is calculated as the difference between the current policing rate ER(j) and the first scheduled rate $t_{first}$ and the difference between the first and last scheduled rates $t_{first}-t_{last}$. If the processor 30 finds a true condition after executing Step 242, the contents of the last registers $DER_{last}$, $t_{last}$ are shifted to the first registers ($DER_{first}$, $t_{first}$) respectively, and the $t_{last}$ buffer 78 is set equal to tb(j) plus τ3 while the last scheduled rate $t_{last}$ buffer 80 is set equal to the current explicit rate ER(j). This is seen at Step 244.

Otherwise, at statement 246, the processor 30 is directed to assign the current explicit rate value ER(j) as the new last scheduled rate $DER_{last}$ value, with no change to the last scheduled rate application time.

Statement 248 directs the processor 30 to determine whether or not the current explicit rate ER(j) is less than both the first and last scheduled rates $DER_{first}$, $DER_{last}$. If so, then Block 250 directs the processor 30 to determine whether or not the current policing rate ER(j) is decreasing and whether or not first or second options have the least cheating headroom. The cheating headroom of the first option is calculated as the product of the difference between the first and last scheduled rates and the excess amount of time $t_{last}$ the last scheduled rate would remain in effect. The cheating headroom for option 2 is calculated as the product of the difference between the current policing rate and the first scheduled rate ($PACR-DER_{first}$) and the difference between the first and last scheduled rate application times ($t_{first}-t_{last}$).

If the condition tested in statement 250 is found to be true, the processor 30 shifts the contents of the last scheduled rate buffers ($DER_{last}$, $t_{last}$) to the first scheduled rate buffers ($DER_{first}$, $t_{first}$) and the last scheduled rate application time $t_{last}$ buffer 78 is loaded with the time value tb(j) plus τ2 while the last scheduled rate $DER_{last}$ buffer 80 is set equal to the current explicit rate ER (j). Otherwise, there is no change to the first scheduled rate buffers $DER_{first}$, $t_{first}$ (84,82) and the last scheduled rate buffers $DER_{last}$, $t_{last}$ (80, 78) are updated as described immediately above.

Referring to FIG. 4d, at statement 252, the processor 30 is directed to determine whether or not the current explicit rate ER (j) is greater than both the first and last scheduled rates $DER_{first}$, $DER_{last}$. If so, statement 254 directs the processor 30 to determine whether or not the current policing rate PACR is greater than or equal to the first scheduled rate $DER_{first}$ and whether or not the cheating headroom for a first option is greater than the cheating headroom for a second option. The cheating headroom for the first option is calculated as the product of the difference between the first and last scheduled rates ($DER_{first}-DER_{last}$) and the excess amount of time during which the last scheduled rate $DER_{last}$ would remain in effect. The cheating headroom for option 2 is calculated as the product of the difference between the current policing rate PACR and the first scheduled rate $DER_{first}$ and the difference between the first and last scheduled rates $DER_{first}-DER_{last}$. If the conditions evaluated at statement 254 are found to be true, then the contents of the last scheduled rate buffers $DER_{last}$, $t_{last}$ are transferred to the first scheduled rate buffers $DER_{first}$, $t_{first}$ and the last scheduled rate time $t_{last}$ buffer 78 is loaded with the value tb(j) plus τ3 while the last scheduled rate buffer $DER_{last}$ 80 is loaded with the current explicit rate ER(j).

Otherwise, the first scheduled rate buffer $DER_{first}$ 84 contents are left intact while the last scheduled rate buffers $DER_{last}$ 80, $t_{last}$ 78 are updated as indicated immediately above.

At statement 256, the processor 30 is directed to determine whether or not the current explicit rate ER(j) is greater than both the first scheduled rate $DER_{first}$ and the last scheduled rate $DER_{last}$. If this condition is true, then statement 258 directs the processor 30 to determine whether or not the current policing rate PACR is decreasing and whether or not the cheating headroom of a first option is greater than the cheating headroom of a second option. The cheating headroom of the first option is calculated as the product of the difference between the current explicit rate and the last scheduled rate ($PACR-DER_{last}$) and the excess amount of time during which the last scheduled rate would remain in effect. The cheating headroom for option 2 is calculated as the difference between the current policing rate and the first scheduled rate ($PACR-DER_{first}$) multiplied by the difference between the first and last scheduled rate application times ($t_{first}-t_{last}$), If the conditions evaluated at statement 258 are true, then the contents of the last scheduled rate buffers $DER_{last}$ are loaded into the contents of the first scheduled rate buffers $DER_{first}$ 84, $t_{first}$ 82 and the last scheduled rate time application buffer $t_{last}$ 78 is loaded with the value tb(j) plus τ3 while the contents of the last scheduled rate buffer $DER_{last}$ 80 are loaded with the current explicit rate value ER(j). Otherwise, referring to FIG. 4e, statement 260 directs the processor 30 to determine whether or not the last scheduled rate time $t_{last}$ is greater than tb(j) plus τ3 and if so, to set the contents of the last scheduled rate buffer $t_{last}$ 78 equal to tb(j) plus τ3 and to set the contents of the last scheduled rate buffer $DER_{last}$ 80 equal to the current explicit rate ER(j).

At statement 262, the processor 30 is directed to determine whether or not the current explicit rate ER(j) is greater than or equal to the first scheduled rate $DER_{first}$ but less than the last scheduled rate $DER_{last}$. If so, the processor 30 is directed to statement 264 which causes it to determine whether or not the current policing rate PACR is decreasing and is less than the last scheduled rate $DER_{last}$. If so, then the contents of the last scheduled rate buffers $DER_{last}$ 80, $t_{last}$ 78 are shifted to the first scheduled rate buffers $DER_{first}$ 84, $t_{first}$ 82 and the last scheduled time buffer $t_{last}$ 78 is loaded with the value tb(j) plus τ2 while the last scheduled rate buffer $DER_{last}$ 80 is loaded with the current explicit rate. Otherwise, only the contents of the last scheduled rate buffer $DER_{last}$ 80 are copied to the first scheduled rate buffer $DER_{first}$ 84, the first scheduled rate application time $t_{first}$ remaining as it was before statement 264 was executed. The contents of the last scheduled rate buffers $DER_{last}$ 80 and $t_{last}$ 78 are loaded as indicated as immediately above.

At statement 266, the processor 30 is directed to determine whether or not the current explicit rate ER(j) is less than both the first scheduled rate $DER_{first}$ and the last scheduled rate $DER_{last}$. If so, statement 268 directs the processor 30 to determine whether or not the current policing rate PACR is decreasing and is less than the last scheduled rate $DER_{last}$. If so, then the contents of the last scheduled rate buffers $DER_{last}$ 80, $t_{last}$ 78 are copied to the contents of the first scheduled rate buffers $DER_{first}$ 84, $t_{first}$ 82 and the last scheduled rate application time buffer $t_{last}$ 78 is loaded with the value tb(j) plus τ2 while the last scheduled rate buffer $DER_{last}$ 80 is loaded with the explicit rate ER(j).

Otherwise, if the conditions at statement 268 are not true, then only the last scheduled rate $DER_{last}$ 80 is copied to the first scheduled rate buffer $DER_{first}$ 84 and the contents of the first scheduled rate application time buffer $t_{first}$ 82 remain as they were before statement 268 was executed. In addition, the last scheduled rate buffers $DER_{last}$ 80, $t_{last}$ 78 are loaded as described immediately above.

Referring to FIG. 4(f), the final portion of the schedule update algorithm is shown generally at 270 and directs the processor to perform a time sequence check to ensure $t_{last}$ is later than $t_{first}$. The time sequence check begins with a first statement 272 which directs the processor to determine whether or not the first scheduled rate application time $t_{first}$ is greater than the last scheduled rate application time $t_{last}$. If so, then the contents of the last scheduled rate buffers $DER_{last}$ 80, $t_{last}$ 78 are copied to the first scheduled rate buffers $DER_{first}$ 84, $t_{first}$ 82 and the last scheduled rate buffers $DER_{last}$ 80, $t_{last}$ 78 are set equal to zero.

In general, the statements shown in FIGS. 4(a)–4(f) act as processor-readable instructions and means for directing the processor to determine whether or not a current cell rate is greater than or equal to the first policing rate and if so, to copy the first policing rate into the current policing rate buffer, copy the last policing rate application time into the first policing rate application time buffer, copy the last policing rate into the first policing rate buffer and set the contents of the last policing rate buffer and the last policing rate application time buffer to zero.

In the above manner, first and last scheduled rates and the current policing rate are updated, depending upon the current explicit rate ER(j).

Thus, the processor is directed to set the contents of the policing rate buffers and the policing rate application time buffers according to the relative magnitudes of the current policing rate and the contents of the policing rate buffer, in response to the departure of a backward resource management cell to the source.

FIG. 5

Referring to FIGS. 5(a) through 5(d), a policing algorithm is shown generally at 273 and includes a first portion shown in FIG. 5(a) for determining whether or not the current policing rate PACR should be updated, it includes a second portion shown in FIG. 5(b) for determining whether or not the currently received cell in the forward direction is a CLP=O FRM cell, it includes a third portion shown in FIG. 5c for determining the policing increment to be used and includes a fourth portion shown in FIG. 5d for determining whether or not the cell is conforming.

Referring to FIG. 5(a), when a cell is received from the source at the cell receive port 34, the processor 30 is directed to statement 274 which causes it to determine whether or not the present time is greater than or equal to the first scheduled time $t_{first}$ and whether or not the first scheduled time is not equal to zero. If this condition is true, then the contents of the first scheduled rate buffer $DER_{first}$ 84 are transferred to the current policing rate buffer PACR 86, the contents of the last scheduled rate buffers $DER_{last}$, $t_{last}$ are transferred to the first scheduled rate buffers $DER_{first}$, $t_{first}$ and the contents of the last scheduled rate buffers $DER_{last}$ 80, $t_{last}$ 78 are set equal to zero. Thus the BRM transmit/receive port 32 acts as a receiver and means for receiving a cell from the source at a time ta(k) and the statements shown in FIG. 5a act as processor-readable instructions for directing the processor to determine whether or not the current policing rate should be updated. More particularly these instructions act as processor-readable instructions and means for directing the processor to determine whether the current policing rate is equal to the first policing rate and for determining whether the first policing rate application time is equal to the last policing rate application time and for determining whether the first policing rate is equal to the last policing rate and for determining whether the last policing rate application time is equal to zero and for determining whether the last policing rate is equal to zero and if so, changing the contents of the current policing rate buffer.

Referring to FIGS. 2 and 5(b), the processor is then directed to determine whether or not the cell received at the cell receive port 34 is an FRM cell with a CLP value equal to zero. To do this, the processor 30 is directed to statement 276 which causes it to determine whether or not the CLP portion of the FRM cell is equal to zero. If so, then the processor 30 is directed to statement 278 which causes it to determine whether or not the time elapsed since the last CLP equals zero forward resource management cell was received was greater than the sum of the ACR decrease time factor ADTF 68 and the cell delay variation tolerance $\tau_1$ 60. If so, then the current policing rate PACR is set equal to the minimum of the initial cell rate (ICR) 66 of the forward direction and the current policing rate PACR (86). In addition, the contents of the last scheduled rate $t_{last}$ 78 buffer is loaded with the time the last received CLP equals zero FRM cell was received.

At FIG. 5(c), the processor 30 is directed to determine the policing increment 90 to be used in policing calculations. In this regard, the processor executes statement 280 which directs it to set the contents of the policing increment buffer 90 equal to the minimum of the reciprocal of the current policing rate PACR and the previous policing increment I_old (72). Thus, the instructions shown in FIG. 5(c) act as processor-readable instructions and act as means for directing the processor to calculate and store a current policing increment value. More particulary, these instructions act as processor-readable instructions and means for directing the processor to determine the minimum value of the reciprocal of the current and immediately past policing increment values.

In FIG. 5(d), the processor is directed to determine whether or not the forward resource management FRM cell is conforming to the policing values. To do this, the processor executes statement 282 which directs it to determine whether or not the last virtual scheduled time LVST (70) plus the contents of the policing increment buffer 90 are less than or equal to the last time at which the CLP equal zero FRM cell was received Ta(k) plus $\tau 1$, the cell delay variation tolerance. If so, then the cell is deemed to be conforming and the contents of the last virtual scheduled time buffer LVST 70 are set equal to the maximum of the last time at which a CLP equals zero FRM cell was received and the sum of the last virtual scheduled time LVST (70) and the contents of the policing increment buffer 90. In addition, the previous policing increment I_old (72) is set equal to the reciprocal of the current policing rate 1/PACR. Thus, the instructions shown in FIG. 5d act as processor-readable instructions and act as means for directing the processor to determine whether or not the cell received from the source conforms to the policing rate. More particularly, these instructions act as processor-readable instructions and means for directing the processor to determine whether or not the sum of a last virtual scheduled time (LVST) and the minimum value is less than or equal to the sum of the time ta(k) and the cell delay variation tolerance value.

Otherwise, the cell is not conforming to the current policing value and the processor 30 sets the violation signal output 43 active. Other circuitry (not shown), within the policer may then cause the cell to be dropped.

Alternatives

Referring to FIG. 2, it will be appreciated that the programs stored on the ROM may be stored on a portable memory medium such as a floppy disk 290 and read by the disk drive 45 in communication with the processor 30. In such an embodiment, the codes for directing the processor to execute the algorithms shown in FIG. 3, 4 and 5 are stored in computer readable format on the floppy disk 290. Alternatively, the floppy disk 290 may be replaced by a compact disc. The floppy disk 290 or compact disc thus act as a computer-readable storage medium on which is stored a plurality of computer readable instruction for directing a processor to adjust policing cell rates at a switch interface, for cells received from a source in an allowed cell rate system and for directing a processor to act as a policer for policing cell rates at a switch interface in an allowed cell rate system.

Referring to FIG. 2, effectively, the policing interface 28 monitors the rate at which data is transferred in the forward direction and compares it with an explicit cell rate specified by the network in backward resource management BRM cells. Thus, the network specifies an explicit cell rate, at which it expects to see data, by loading a backward resource Management cell with such explicit cell rate and transmitting said BRM cell to the source through the policing interface 28. The policing interface 28 receives the BRM cells in the BRM transmit/receive port 32, reads the explicit cell rate ER(j) from the BRM cell received at the BRM transmit/receive port 32 and re-transmits the BRM cell to the source.

The above described invention enables the policing rate to best conform to the rates specified by the switch. Without the invention each of the rates provided by the switch would have to be stored during the transit time for a new rate to be dispatched from the policer and the effect to be received at the forward path on the input to the policer. The present invention minimizes the amount of memory required to adjust the policing rate in a manner which keeps cheating headroom due to distance affects, to a minimum.

While specific embodiments of the invention have been described and illustrated, such embodiments should be considered illustrative of the invention only and not as limiting the invention as construed in accordance with the accompanying claims.

What is claimed is:

1. A method of adjusting policing cell rates at a switch interface, for cells received from a source in an allowed cell rate system, the method including the steps of:
    a) storing a current policing rate (PACR) in a current policing rate buffer;
    b) storing a plurality of policing rates and policing rate application times in respective policing rate and policing rate application time buffers;
    c) in response to the departure of a backward resource management cell to the source at time tb(j), setting the contents of said policing rate buffers and said policing rate application time buffers according to the relative magnitudes of said current policing rate and the contents of said policing rate buffers.

2. A method as claimed in claim 1 further including the steps of
    a) storing a current policing rate (PACR) in a current policing rate buffer;
    b) storing a first policing rate ($DER_{first}$) and a first policing rate application time ($t_{first}$) in a first policing rate buffer and a first policing rate time buffer respectively;
    c) storing a last policing rate ($DER_{last}$) and a last policing rate application time ($t_{last}$) in a last policing rate buffer and a last policing rate time buffer respectively.

3. A method as claimed in claim 2 further including the step of receiving a backward resource management cell and on receiving such cell, determining whether or not a current cell rate is greater than or equal to said first policing rate and if so copying said first policing rate into said current policing rate buffer, copying said last policing rate application time into said first policing rate application time buffer, copying said last policing rate into said first policing rate buffer and setting the contents of said last policing rate buffer and said last policing rate application time buffer to zero.

4. A method as claimed in claim 2 further including the step of determining whether or not said first policing rate application time is earlier than said last policing rate application time and if so copying said first policing rate into said current policing rate buffer, copying said last policing rate application time into said first policing rate application time buffer, copying said last policing rate into said first policing rate buffer and setting the contents of said last policing rate buffer and said last policing rate application time buffer to zero.

5. A method as claimed in claim 2 further including the step of receiving a cell from said source at a time ta(k) and determining whether or not the current policing rate should be updated.

6. A method as claimed in claim 5 wherein the step of determining whether or not the current policing rate should be updated includes the step of determining whether said current policing rate is equal to said first policing rate and whether said first policing rate application time is equal to said last policing rate application time and whether said first policing rate is equal to said last policing rate and whether said last policing rate application time is equal to zero and whether said last policing rate is equal to zero and if so, changing said current policing rate.

7. A method as claimed in claim 5 further including the step of determining whether or not said cell received from said source conforms to said policing rate.

8. A method as claimed in claim 7 wherein the step of determining whether or not said cell received from said source conforms to said policing rate includes the step of calculating a policing increment value.

9. A method as claimed in claim 8 wherein the step of calculating said policing increment value includes the step of determining the minimum value of the reciprocal of a current and immediately past policing increment values.

10. A method as claimed in claim 9 further including the step of determining whether or not the sum of a last virtual scheduling time (LVST) and said minimum value is less than or equal to the sum of the time ta(k) and a cell delay variation tolerance value.

11. A method as claimed in claim 2 further including the steps of:

If $(ER(j)<DER_{first}$ AND $ER(j)>=DER_{last})$
  IF $(PACR>=DER_{first}AND(PACR-DER_{first})(t_{last}-t_{first})$
    $<(ER(j)-DER_{last})(tb(j)+\tau 3-t_{last}))$
assigning the contents of said first and second policing rate buffers and said first and second application time buffers as follows: $t_{first}=t_{last}$; $DER_{first}=DER_{last}$; $t_{last}=tb(j)+\tau 3$; $DER_{last}$ $ER(j)$ ELSE $DER_{last}=ER(j)$
ELSE
  IF $(ER(j)<DER_{first}$ AND $ER(j)<DER_{last})$
    IF $(PACR<=DER_{first}AND(PACR-DER_{first})(t_{last}-t_{first})$
      $<(DER_{first}-DER_{last})(tb(j)+\tau 2-t_{last}))$
assigning the contents of said first and second policing rate buffers and said first and second application time buffers as follows: $t_{first}=t_{last}$; $DER_{first}=DER_{last}$; $t_{last}=tb(j)+\tau 2$; $DER_{last}=ER(j)$;
ELSE
assigning the contents of said first and second policing rate buffers and said first and second application time buffers as follows: $t_{last}=tb(j)+\tau 2$; $DER_{last}=ER(j)$;
ELSE
  IF $(ER(j)>=DER_{first}ANDER(j)>=DER_{last})$
    IF $(PACR>=DER_{first}AND(PACR-DER_{first})(t_{last}-t_{first})$
      $<(DER_{first}-DER_{last})(tb(j)+\tau 3-t_{last}))$
assigning the contents of said first and second policing rate buffers and said first and second application time buffers as follows: $t_{first}=t_{last}$; $DER_{first}=DER_{last}$; $t_{last}=tb(j)+\tau 3$; $DER_{last}=ER(j)$;
ELSE
assigning the contents of said first and second policing rate buffers and said first and second application time buffers as follows: $t_{last}=tb(j)+\tau 3$; $DER_{last}=ER(j)$;
ELSE
  IF $(ER(j)>=DER_{first}ANDER(j)>=DER_{last})$
    IF $(PACR>=DER_{first}AND(PACR-DER_{first})(t_{last}-t_{first})$
      $<(ER(j)-DER_{last})(tb(j)+\tau 3-t_{last}))$
assigning the contents of said first and second policing rate buffers and said first and second application time buffers as follows: $t_{first}=t_{last}$; $DER_{first}=DER_{last}$; $t_{last}=tb(j)+\tau 3$; $DER_{last}=ER(j)$;
ELSE IF $(t_{last}>tb(j)+\tau 3)$
assigning the contents of said first and second policing rate buffers and said first and second application time buffers as follows: $t_{last}=tb(j)+\tau 3$; $DER_{last}=ER(j)$
ELSE IF $(ER(j)>=DER_{first}ANDER(j)<DER_{last})$
  IF $(PACR>=DER_{first}ANDPACR<DER_{last})$
assigning the contents of said first and second policing rate buffers and said first and second application time buffers as follows: $t_{first}=t_{last}$; $DER_{first}=DER_{last}$; $t_{last}=tb(j)+\tau 2$; $DER_{last}=ER(j)$;
ELSE
assigning the contents of said first and second policing rate buffers and said first and second application time buffers as follows: $DER_{first}=DER_{last}$; $t_{last}=tb(j)+2$; $DER_{last}=ER(j)$;
ELSE
  IF $(ER(j)<DER_{first}ANDER(j)<DER_{last})$
    IF $(PACR>=DER_{first}ANDPACR<DER_{last})$
assigning the contents of said first and second policing rate buffers and said first and second application time buffers as follows: $t_{first}=t_{last}$; $DER_{first}=DER_{last}$; $t_{last}=tb(j)+\tau 2$; $DER_{last}=ER(j)$
ELSE
assigning the contents of said first and second policing rate buffers and said first and second application time buffers as follows: $DER_{first}=DER_{last}$; $t_{last}=tb(j)+\tau 2$; $DER_{last}=ER(j)$;

Where:

$t_{first}$ is the contents of the first application time buffer $t_{last}$ is the contents of the second application time buffer $DER_{first}$ is the contents of the first policing rate buffer $DER_{last}$ is the contents of the second policing rate buffer tb(j) is the time at which a backward resource management cell is transmitted to the source;

$\tau 2$ is an upper limit on feedback delay;

$\tau 3$ is a lower limit on feedback delay; and

ER(j) is a new rate as determined from a previous cell received from the source; and PACR is the current policing rate.

12. A policer for policing cell rates at a switch interface, for cells received from a source in an allowed cell rate system, the method including the steps of:

a) storing a current policing rate (PACR) in a current policing rate buffer;

b) storing a plurality of policing rates and policing rate application times in respective policing rate and policing rate application time buffers;

c) in response to the departure of a backward resource management cell to the source at time tb(j), setting the contents of said policing rate buffers and said policing rate application time buffers according to the relative magnitudes of said current policing rate buffer and the contents of said policing rate buffers; and d) determining whether or not said cell received from said source conforms to said policing rate and if not rejecting said cell received from said source.

13. An apparatus for adjusting policing cell rates at a switch interface, for cells received from a source in an allowed cell rate system, the apparatus comprising:

a) memory for storing a current policing rate (PACR) in a current policing rate buffer;

b) memory for storing a plurality of policing rates and policing rate application times in respective policing rate and policing rate application time buffers;

c) a BRM cell departure signal generator for generating a BRM cell departure signal when a BRM cell to transmitted to a source end system;

d) a processor for setting the contents of said policing rate buffers and said policing rate application time buffers according to the relative magnitudes of said current policing rate and the contents of said policing rate buffer, in response to the departure of a backward resource management cell to the source.

14. An apparatus as claimed in claim 13 further including a timer for providing an indication of a current time tb(j) at which said BRM cell is transmitted.

15. An apparatus as claimed in claim 13 further including:

a) a current policing rate buffer for storing a current policing rate (PACR);

b) a first policing rate buffer and a first policing rate time buffer for storing a first policing rate ($DER_{first}$) and a first policing rate application time ($t_{first}$) respectively; and c) a last policing rate buffer and a last policing rate time buffer for storing a last policing rate ($DER_{last}$) and a last policing rate application time ($t_{last}$) in respectively.

16. An apparatus as claimed in claim 15 further including a receiver for receiving a backward resource management cell and processor-readable instructions for directing said processor to determine whether or not a current cell rate is greater than or equal to said first policing rate and if so, copying said first policing rate into said current policing rate buffer, copying said last policing rate application time into said first policing rate application time buffer, copying said last policing rate into said first policing rate buffer and setting the contents of said last policing rate buffer and said last policing rate application time buffer to zero.

17. An apparatus as claimed in claim 15 further including processor-readable instructions for directing said processor to determine whether or not said first policing rate application time is earlier than said last policing rate application time and if so, copying said first policing rate into said current policing rate buffer, copying said last policing rate application time into said first policing rate application time buffer, copying said last policing rate into said first policing rate buffer and setting the contents of said last policing rate buffer and said last policing rate application time buffer to zero.

18. An apparatus as claimed in claim 15 further including a receiver for receiving a cell from said source at a time ta(k) and processor-readable instructions for directing said processor to determine whether or not the current policing rate should be updated.

19. An apparatus as claimed in claim 18 further including processor-readable instructions for directing the processor to determine whether said current policing rate is equal to said first policing rate and for determining whether said first policing rate application time is equal to said last policing rate application time and for determining whether said first policing rate is equal to said last policing rate and for determining whether said last policing rate application time is equal to zero and for determining whether said last policing rate is equal to zero and if so, changing the contents of said current policing rate buffer.

20. An apparatus as claimed in claim 18 further including processor-readable instructions for directing said processor to determine whether or not said cell received from said source conforms to said policing rate.

21. An apparatus as claimed in claim 20 further including memory and processor-readable instructions for directing said processor to calculate and store a current policing increment value.

22. An apparatus as claimed in claim 21 further including memory for storing said current and immediately past policing increment values and processor-readable instructions for directing said processor to determine the minimum value of the reciprocal of said current and immediately past policing increment values.

23. An apparatus as claimed in claim 22 further including memory for storing a cell delay variation tolerance value and processor-readable instructions for directing said processor to determine whether or not the sum of a last virtual scheduling time (LVST) and said minimum value is less than or equal to the sum of the time ta(k) and said cell delay variation tolerance value.

24. An apparatus for adjusting policing cell rates at a switch interface, for cells received from a source in an allowed cell rate system, the apparatus comprising:

a) means for storing a current policing rate (PACR) in a current policing rate buffer;

b) means for storing a plurality of policing rates and policing rate application times in respective policing rate and policing rate application time buffers;

c) means for generating a BRM cell departure signal when a BRM cell to transmitted to a source end system;

d) means for setting the contents of said policing rate buffers and said policing rate application time buffers according to the relative magnitudes of said current policing rate and the contents of said policing rate buffer, in response to the departure of a backward resource management cell to the source.

25. An apparatus as claimed in claim 24 further including a timer for providing an indication of a current time tb(j) at which said BRM cell is transmitted.

26. An apparatus as claimed in claim 24 further including:

a) a current policing rate buffer for storing a current policing rate (PACR);

b) a first policing rate buffer and a first policing rate time buffer for storing a first policing rate ($DER_{first}$) and a first policing rate application time ($t_{first}$) respectively; and c) a last policing rate buffer and a last policing rate time buffer for storing a last policing rate ($DER_{last}$) and a last policing rate application time ($t_{last}$) in respectively.

27. An apparatus as claimed in claim 26 further including a receiving means for receiving a backward resource management cell and means for directing said processor to determine whether or not a current cell rate is greater than or equal to said first policing rate and if so, copying said first policing rate into said current policing rate buffer, copying said last policing rate application time into said first policing rate application time buffer, copying said last policing rate into said first policing rate buffer and setting the contents of said last policing rate buffer and said last policing rate application time buffer to zero.

28. An apparatus as claimed in claim 26 further including means for determining whether or not said first policing rate application time is earlier than said last policing rate application time and if so, copying said first policing rate into said current policing rate buffer, copying said last policing rate application time into said first policing rate application time buffer, copying said last policing rate into said first policing rate buffer and setting the contents of said last policing rate buffer and said last policing rate application time buffer to zero.

29. An apparatus as claimed in claim 26 further including a means for receiving a cell from said source at a time ta(k) and means for determining whether or not the current policing rate should be updated.

30. An apparatus as claimed in claim 29 further including means for determining whether said current policing rate is equal to said first policing rate and for determining whether said first policing rate application time is equal to said last policing rate application time and for determining whether said first policing rate is equal to said last policing rate and for determining whether said last policing rate application time is equal to zero and for determining whether said last policing rate is equal to zero and if so, changing the contents of said current policing rate buffer.

31. An apparatus as claimed in claim 29 means for determining whether or not said cell received from said source conforms to said policing rate.

32. An apparatus as claimed in claim 31 further including memory and means for calculating and storing a current policing increment value.

33. An apparatus as claimed in claim 32 further including memory for storing said current and immediately past policing increment values and means for determining the minimum value of the reciprocal of said current and immediately past policing increment values.

34. An apparatus as claimed in claim 33 further including memory for storing a cell delay variation tolerance value and means for determining whether or not the sum of a last virtual scheduling time (LVST) and said minimum value is less than or equal to the sum of the time ta(k) and said cell delay variation tolerance value.

35. A computer-readable storage medium on which is stored a plurality of computer readable instruction for directing a processor to adjust policing cell rates at a switch interface, for cells received from a source in an allowed cell rate system, said instructions being operable to direct said processor to perform the steps of:
   a) storing a current policing rate (PACR) in a current policing rate buffer;
   b) storing a plurality of policing rates and policing rate application times in respective policing rate and policing rate application time buffers;
   c) in response to the departure of a backward resource management cell to the source at time tb(j), setting the contents of said policing rate buffers and said policing rate application time buffers according to the relative magnitudes of said current policing rate and the contents of said policing rate buffers.

36. A computer-readable storage medium as claimed in claim 35 further including codes operable to direct the processor to perform the steps of
   a) storing a current policing rate (PACR) in a current policing rate buffer;
   b) storing a first policing rate ($DER_{first}$) and a first policing rate application time ($t_{first}$) in a first policing rate buffer and a first policing rate time buffer respectively;
   c) storing a last policing rate ($DER_{last}$) and a last policing rate application time ($t_{last}$) in a last policing rate buffer and a last policing rate time buffer respectively.

37. A computer-readable storage medium as claimed in claim 36 further including codes operable to direct the processor to perform the step of receiving a backward resource management cell and on receiving such cell, determining whether or not a current cell rate is greater than or equal to said first policing rate and if so copying said first policing rate into said current policing rate buffer, copying said last policing rate application time into said first policing rate application time buffer, copying said last policing rate into said first policing rate buffer and setting the contents of said last policing rate buffer and said last policing rate application time buffer to zero.

38. A computer-readable storage medium as claimed in claim 36 further including codes operable to direct the processor to perform the step of determining whether or not said first policing rate application time is earlier than said last policing rate application time and if so copying said first policing rate into said current policing rate buffer, copying said last policing rate application time into said first policing rate application time buffer, copying said last policing rate into said first policing rate buffer and setting the contents of said last policing rate buffer and said last policing rate application time buffer to zero.

39. A computer-readable storage medium as claimed in claim 36 further including codes operable to direct the processor to perform the step of receiving a cell from said source at a time ta(k) and determining whether or not the current policing rate should be updated.

40. A computer-readable storage medium as claimed in claim 39 further including codes operable to direct the processor to perform the step of determining whether said current policing rate is equal to said first policing rate and whether said first policing rate application time is equal to said last policing rate application time and whether said first policing rate is equal to said last policing rate and whether said last policing rate application time is equal to zero and whether said last policing rate is equal to zero and if so, changing said current policing rate.

41. A computer-readable storage medium as claimed in claim 39 further including codes operable to direct the processor to perform the step of determining whether or not said cell received from said source conforms to said policing rate.

42. A computer-readable storage medium as claimed in claim 41 further including codes operable to direct the processor to perform the step of determining the minimum value of the reciprocal of a current and immediately past policing increment values.

43. A computer-readable storage medium as claimed in claim 42 further including codes operable to direct the processor to perform the step of determining whether or not the sum of a last virtual scheduling time (LVST) and said minimum value is less than or equal to the sum of the time ta(k) and a cell delay variation tolerance value.

\* \* \* \* \*

UNITED STATES PATENT AND TRADEMARK OFFICE
CERTIFICATE OF CORRECTION

PATENT NO. : 6,175,568 B1
DATED : January 16, 2001
INVENTOR(S) : Ra'ed Yousif Awdeh It is certified that error appears in the above-identified patent and that said Letters Patent is hereby corrected as shown below:

Column 15,
Line 54, delete "$t_{first}=t_{last}$; $DER_{first}=DER_{last}$; $t_{last}=tb(j)+\tau\ 3$; $DER_{last}$" and substitute -- $t_{first}=t_{last}$; $DER_{first}=DER_{last}$; $t_{last}=tb(j)+\tau\ 3$; $DER_{last}=$ -- therefor;

Column 16,
Line 37, delete "$DER_{first}=DER_{last}$; $t_{last}=tb(j)+2$; $DER_{last}=ER(j)$;" and substitute -- $DER_{first}=DER_{last}$; $t_{last}=tb(j)+\tau\ 2$; $DER_{last}=ER(j)$; -- therefor.

Signed and Sealed this

Twenty-ninth Day of January, 2002

Attest:

JAMES E. ROGAN
Attesting Officer  Director of the United States Patent and Trademark Office